Dec. 17, 1968          K. H. STEIGERWALD ET AL          3,417,224
              METHOD AND DEVICE FOR WORKING MATERIAL BY
                     MEANS OF A CORPUSCULAR BEAM
Filed Aug. 5, 1965                                 2 Sheets-Sheet 1

*Inventors:*
KARL HEINZ STEIGERWALD
EDGAR MEYER

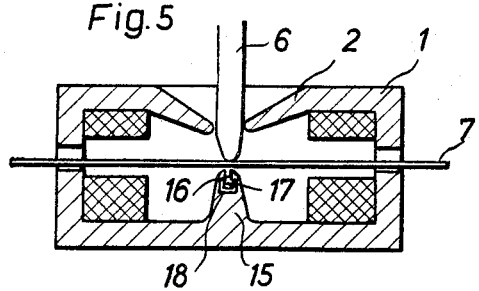
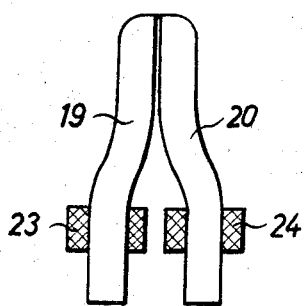
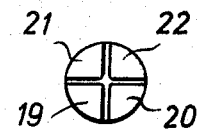
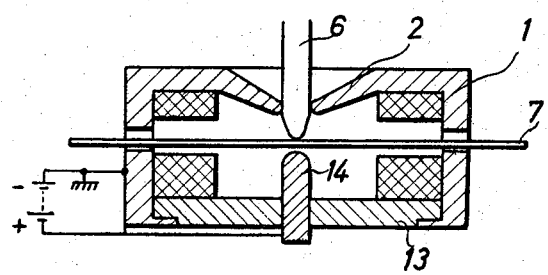
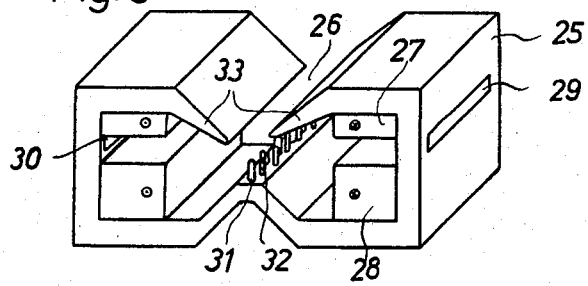

United States Patent Office

3,417,224
Patented Dec. 17, 1968

3,417,224
METHOD AND DEVICE FOR WORKING MATERIAL BY MEANS OF A CORPUSCULAR BEAM
Karl H. Steigerwald, Wasseralfingen, and Edgar Meyer, Gilching, Germany, assignors to K. H. Steigerwald G.m.b.H., Wasseralfingen, Germany
Filed Aug. 5, 1965, Ser. No. 477,486
Claims priority, application Germany, Aug. 5, 1964, St 22,502
19 Claims. (Cl. 219—121)

ABSTRACT OF THE DISCLOSURE

An apparatus is described wherein an unusual magnetic lens is used with a beam of charged particles such that the beam is focused at a point located within the active region of the magnetic lens. Workpiece passages are provided in the side of the lens so as to permit machining of a workpiece inserted through the passages at a point of greatest power density and minimum spherical aberration. The magnetic lens includes either a single or plurality of pin portions opposite the pole shoes of the lens. The pins may be threadedly secured to the lens to provide axial adjustment thereof such that the focal length of the lens may be varied. Further, the pins may include an eccentric point such that upon rotation thereof, a deflecting effect is produced on the beam. Also, the pins may include a bore therein containing a collecting electrode for generating a desired signal in response to impingement of the beam. Further, the pin may be divided into four sectors each sector having an auxiliary winding so as to compensate for astigmatism of the beam.

---

This invention relates to an improved method and apparatus for machining by beams of charged particles and, more particularly, relates to an improved method and apparatus for focusing.

One of the essential factors in machining by means of a corpuscular beam or beam of charged particles is the concentration of the highest possible power density within a focus of given radius $r$. For this purpose, the corpuscular beam emitted by a beam generating system is usually focused onto the workpiece by means of an electromagnetic lens in which the focusing field is generated between two concentric, centrally perforated pole shoes.

The power density is given by $$\frac{N}{F} = \frac{JU}{\pi 2}$$

The accelerating voltage $U$ should from the very beginning be chosen as high as may seem reasonable in view of the economic and technical means required. The current $J$ passing through the area $\pi r^2$ is a function of the square of the beam aperture $\alpha$ at the focus, because for a given accelerating voltage $U$ and a given temperature $T_K$ of the cathode the brightness $$R = \frac{J}{\pi r^2 \pi \alpha^2}$$

for a given beam generator is a constant. Consequently, $$J = R\pi^2 \, r^2 \alpha^2$$

in other words, the current $J$ is a function of the square of the aperture. The size of the useful aperture $\alpha$ depends essentially on the spherical aberration inherent in the focusing lens. If at a given spherical aberration $\alpha$ exceeds a certain value, the corresponding rays will no longer increase the current at the focus. For this reason, conventional electro-magnetic lenses permit only a certain power density to be attained at the focus of the beam, which depends on the size of the useful aperture $\alpha$. This attainable power density is in many cases too low, resulting in undesirably long maching times.

It is, therefore, an object of the present invention to provide a machining method and a device using a corpuscular beam which make it possible to achieve a higher power density at the focus that with one of the conventional electro-magnetic lenses.

The invention is based on a device in which a magnetic lens is used for focusing the corpuscular beam on the workpiece. Investigations have shown that the spherical aberration of a lens is a minimum when the field intensity has its axial maximum in the object or the focus. In accordance with the invention, the focus of the beam and the object to be machined are, therefore, brought into the axial field maximum of the focusing lens or into the immediate vicinity of this maximum.

In a preferred device designed in accordance with the invention, the focusing lens has a perforated pole shoe on the side facing the source of radiation and, on the side opposite the source of radiation, a pin of magnetic material facing the perforated pole shoe, on which the object to be machined is arranged. The maximum of the field intensity is, thus, made to lie in the immediate vicinity of the object. With an identical number of ampere windings, the maximum field intensity of such a lens is higher than that of normal pole shoe lenses.

The upper end of the pin used in the new device may be flat or concave or convex, but it is advantageous to use a pointed pin in order to achieve the highest possible field intensity peak.

It is also possible and will in many cases be advantageous to hold the pin by a material which is of the highest possible magnetic conductivity, but electrically insulating, and to apply an electric voltage between the upper pole shoe and the pin. In this manner, an electric lens is superimposed on the magnetic one.

In order to permit the focal length of the lens to be varied, it is advisable to mount the pin so that it can be displaced axially. In addition, it may, in many cases, be of advantage if the pin can be rotated and is provided with an eccentric point, so that a deflecting effect can be achieved. In this case, it is even possible to compensate for astigmatism to a certain extent by giving the upper portion of the pin a longitudinal cross section.

Since in the new device the corpuscular beam strikes the pin after having perforated or welded the workpiece, it is advantageous to perforate the pin as well as to arrange a collecting electrode in the bore. This collecting electrode should preferably be connected to means for signaling the impingement of the beam and/or switching off the corpuscular beam or advancing the workpiece as soon as the corpuscular beam strikes the collecting electrode. It is also possible to mount the pin electrically insulated and to use it directly as a collecting electrode.

It may also be of advantage to divide the pin into sectors and to provide each of these sectors with an auxiliary winding. It is, thus, possible to attain certain deflecting effects. In addition, astigmatism can be corrected in this manner.

If several beam generating systems are used, it will be advantageous to arrange several pins opposite the perforated pole shoe of the lens. These pins may vary in thickness and height. It is also possible to provide each of these pins with an auxiliary winding. This makes every pin a separate lens, the effect of which may be different from that of the other separate lenses.

For machining purposes, an electromagnetic focusing lens will be used and its winding divided into two parts. The coil core is then provided with two bores or slots facing each other and arranged between the winding elements, which serve to introduce and remove the object to be machined.

Having briefly described this invention, it will be described in greater detail in the following portions of the specification, which may best be understood by reference to the accompanying drawings, of which:

FIG. 5 is a section through a lens provided with a perforated pin;

FIG. 6 is a view of a pin divided into sectors;

FIG. 7 is a top view of the pin shown in FIG. 6;

FIG. 8 is a section through an electromagnetic lens on which an electric lens is superimposed; and FIG. 9 is a perspective view of a focusing lens having several pins.

Figure 1:
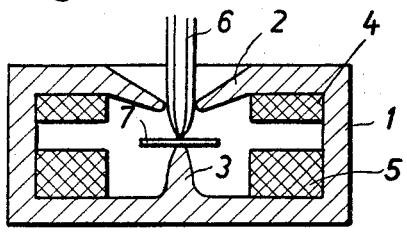
FIG. 1 is a cross sectioned view through a focusing lens designed in accordance with the present invention.
Figure 2:
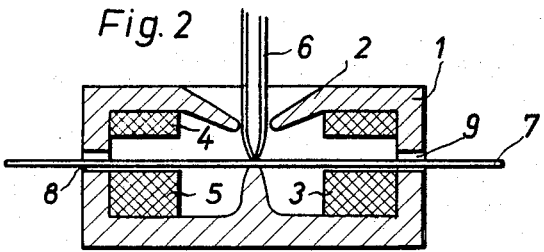
FIG. 2 is a cross sectioned view through said lens as seen from an angle differing by 90° from the one of FIG. 1.

In FIGS. 1 and 2, there is shown an electromagnetic focusing lens with the pole shoe 2 facing the source of radiation (such as an electron beam generator). Opposite this pole shoe is a pin 3 which is of magnetic material. The lens has an upper winding 4 and a lower winding 5. The corpuscular beam 6, for example, an electron beam, is focused by this lens onto the object 7 to be machined, which is arranged on the pin 3. As shown in FIG. 2, the casing of the lens 1 is provided with two opposed slots 8 and 9 through which object 7 to be machined is inserted and removed.

Figure 3:
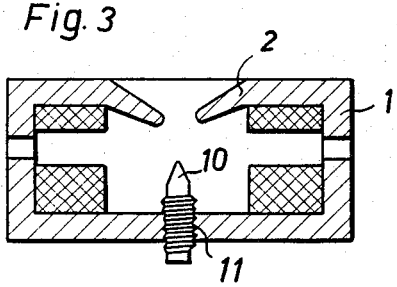
FIG. 3 is a section through another embodiment of the new device.

The electromagnetic focusing lens 1 shown in FIG. 3 has a pin 10, the upper part of which has a conical shape, the entire pin being axially adjustable by means of the thread 11. The point of the pin 10 makes it possible to attain a high field intensity at the workpiece, while the axial adjustment of the pin permits the focal length of the lens to be varied.

Figure 4:
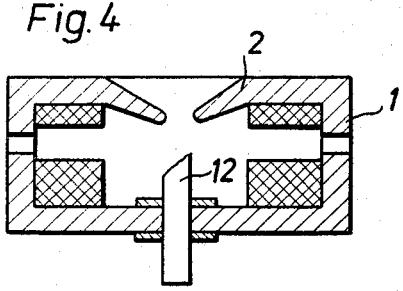
FIG. 4 is a section through still another embodiment.

In the electromagnetic focusing lens 1 shown in FIG. 4, the pin 12 has an eccentric point and can be rotated. This pin makes it possible to exercise a deflecting effect on the beam.

FIG. 5 shows an electromagnetic focusing lens 1 in which the pin 15 is provided with a bore 16. A collecting electrode 17 is disposed in an insulated manner in this bore. This collecting electrode has a lead 18. As soon as the beam 6 penetrates the object 7, it strikes the collecting electrode 17. The latter generates a signal which is preferably used for indicating the impingement of the beam and/or cutting off the beam 6, and/or advancing the object 7.

FIGS. 6 and 7 show a pin which is divided into the four sectors 19, 20, 21, and 22. As is evident from FIG. 6, each of the sectors 19 and 20 is provided with auxiliary windings 23 and 24. In the same manner, the sectors 21 and 22 have auxiliary windings. With the aid of these auxiliary windings, the field produced by each sector can be varied, so that it is possible either to compensate for astigmatism or to deflect the beam.

FIG. 8 shows a lens, the bottom wall 13 of whose housing consists of a magnetically conductive, electrically insulating material, for example, ferrite. The bottom wall 13 holds the pin 14. In order to achieve an electrostatic deflection, this pin may be split. In the embodiment shown, a positive voltage is applied to the pin 14 in order to increase the concentration of the beam 6. An electrostatic accelerating lens is, thus, superimposed on the magnetic focusing lens.

FIG. 9 shows an electromagnetic focusing lens in which the upper pole shoe 33 is provided with a slot. The lens has two separate windings 27 and 28, and the casing of the lens is provided with slots 29 and 30. The slots permit access for inserting and removing the object to be machined. Opposite the pole shoe 33 are several pins, e.g. the pins 31 and 32. As is evident from the example of the pins 31 and 32, these pins may be of different thickness. They may also terminate at a different height and be of longitudinal shape at their ends. In this manner, the flux can be varied and astigmatism compensated individually at each pin.

The multiple lens illustrated in FIG. 9 will be used above all in conjunction with several beam generating systems. Each of the pins will then be a separate focusing lens, so that several operations can be carried out simultaneously on one workpiece.

This invention may be variously modified and embodied within the scope of the subjoined claims.

What is claimed is:

1. The method of machining a workpiece with a corpuscular beam, comprising
   directing a corpuscular beam along a path,
   applying a magnetic field substantially parallel with the path of the beam along a preselected path length thereof with the strength of the magnetic field sufficient to focus a high power density machining beam at an impingement point located within the preselected path length, and
   placing a workpiece generally in the path of the beam in the immediate vicinity of said impingement point in the preselected path length to machine said workpiece in the vicinity of the maximum magnetic field intensity along said beam path.

2. Apparatus for focusing charged particles generated from a source into a beam for the machining of a workpiece located along the path of the beam at a desired beam impingement point comprising
   a magnetic focusing lens disposed along the beam path and having a perforated pole shoe of a first magnetic polarity on a side facing the source of charged particles and a second pole shoe of a second opposite polarity located along the beam path on a side away from the source in the vicinity of the desired impingement point to provide a beam focusing magnetic field of sufficient strength to produce a machining beam of high power density focused at a point located between the pole shoes along the path of the beam.

3. The apparatus as recited in claim 2 wherein said second pole shoe further includes
   a pin of magnetic material facing said perforated pole shoe and placed substantially coincident with the beam path to converge said beam at an impingement location between the tip of the pin facing the source of radiation and the perforated pole shoe and wherein said workpiece is located between the tip of the pin and the perforated pole shoe in the vicinity of the impingement point.

4. Apparatus according to claim 3 in which said pin tip is pointed.

5. Apparatus according to claim 3 in which said pin is adjustably mounted in magnetic relationship with the second pole shoe for movement along the path of the beam to vary the focal point of the beam.

6. Apparatus according to claim 4 in which said pin has an eccentric point radially displaced from the beam path and wherein said pin is rotatably mounted to the second pole shoe for focusing and deflection of said beam towards said displaced eccentric point.

7. Apparatus according to claim 3 in which the pin is formed of a plurality of longitudinal closely spaced non-contacting sections arranged to provide an angularly variable non-uniform magnetic field to compensate for astigmatism of the lens.

8. Apparatus according to claim 7 in which each of said sections is provided with an auxiliary winding for generating a preselected angularly non-uniform magnetic field.

9. Apparatus according to claim 3 in which said pin is provided with a beam-receiving bore and a beam-collecting electrode arranged in said bore.

10. Apparatus according to claim 3 in which said pin is magnetically coupled to the second pole shoe and is electrically insulated therefrom and means for producing a potential difference between said pin and said perforated pole shoe for applying an electrostatic focus effective on said beam.

11. Apparatus according to claim 10 in which said pin is formed of a plurality of closely spaced non-contacting sections electrically insulated from each other, and wherein said potential difference generating means provides preselected voltages to said sections for deflection of said beam.

12. Apparatus according to claim 3 in which a plurality of magnetic pins are linearly arranged along a line located in a plane substantially transverse to the beam path and opposite the perforated pole shoe of the magnetic lens.

13. Apparatus according to claim 12 in which said pins have selected different thicknesses.

14. Apparatus according to claim 12 in which said pins project towards the source of charged particles and terminate at different heights.

15. Apparatus according to claim 12 in which each pin is provided with an auxiliary winding wrapped about a pin for producing a plurality of distinct magnetic fields between said pins and said perforated pole shoe.

16. Apparatus according to claim 12 in which the perforation of said pole shoe facing the source of radiation is a slot located substantially parallel with said linearly arranged pins.

17. Apparatus according to claim 18 wherein said magnetic lens further comprises
a coil core having a side wall magnetically coupling the perforated shoe to the pin with a gap between the pin and the shoe in the vicinity of the beam path, said side wall being provided with a pair of oppositely located workpiece passages facing one another across the beam path between the pin and the pole shoe, and means providing a coil for inducing a beam focusing magnetic field between the pin and the shoe.

18. Apparatus according to claim 17 wherein said coil core is substantially U-shaped in cross-section and provided in the side wall thereof with a workpiece passage in the shape of a slot, and wherein said magnetic field-inducing means includes a two-part coil arranged adjacent the coil core between the perforated pole shoe and the pin, said coil parts being spaced from one another along the beam path and separated by an aperture located in alignment with the slot to provide a passage for a workpiece betwen the pin and the perforated pole shoe.

19. Apparatus according to claim 18 in which said pin is magnetically coupled to a second pole shoe and is electrically insulated therefrom and means for generating a signal indicative of the impingement of said beam on said pin.

References Cited
UNITED STATES PATENTS

| | | | |
|---|---|---|---|
| 2,746,420 | 5/1956 | Steigerwald | 219—121 |
| 2,793,282 | 5/1957 | Steigerwald | 219—121 |
| 2,897,396 | 7/1959 | Von Ardenne | 219—121 |
| 3,152,238 | 10/1964 | Anderson | 219—121 |
| 3,202,794 | 8/1965 | Shrader et al. | 219—121 |
| 3,268,648 | 8/1966 | Dietrich | 219—121 |
| 3,351,731 | 11/1967 | Tanaka | 219—121 |

RICHARD M. WOOD, *Primary Examiner.*

W. DEXTER BROOKS, *Assistant Examiner.*

U.S. Cl. X.R.

219—123